Dec. 10, 1963  E. C. POLIDOR  3,113,807
BALL SLIDE
Filed Oct. 12, 1961

INVENTOR.
EDWARD C. POLIDOR
BY
Attorney

United States Patent Office 3,113,807
Patented Dec. 10, 1963

3,113,807
BALL SLIDE
Edward C. Polidor, Rochester, N.Y., assignor to Automation Gages, Incorporated, Rochester, N.Y., a corporation of New York
Filed Oct. 12, 1961, Ser. No. 144,628
3 Claims. (Cl. 308—6)

This invention relates to ball slides and more particularly to ball slides intended for use on precision instruments and apparatus.

The primary object of the present invention is to provide a novel ball slide construction having means for adjusting the pre-load on the ball races.

Another object is to provide a novel construction of this type in which the pre-load may be adjusted relatively simply and quickly and after final assembly and to compensate for manufacturing tolerances, and also for wear after use.

A further object is to provide a novel ball slide including a pre-load adjusting mechanism which is of relatively simple and inexpensive construction, yet rugged and long-lasting in service.

The foregoing and other objects and advantages of the invention will become apparent hereinafter from the specification and from the recital of the appended claims particularly when taken in conjunction wtih the accompanying drawing wherein:

Figure 1:
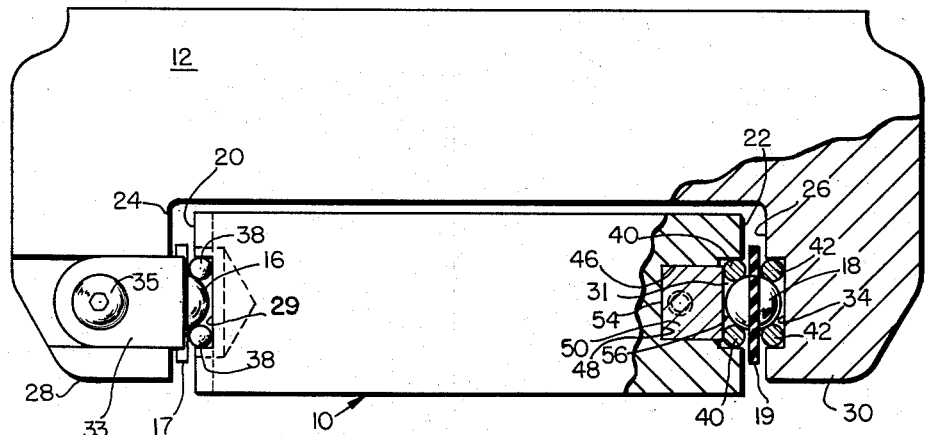
FIG. 1 is an end elevation, partly in section, of a ball slide made according to a presently preferred embodiment of the invention.

The present invention has to do primarily with ball slides of the type in which the ball recesses are formed by rods, which are loosely fitted in and extend along the corners of opposing channels, or grooves in the tongue and the slide member, respectively, and which transmit the load stresses from the balls to the tongue and the slide member.

Briefly, the invention provides pre-load adjustment by supporting one pair of the rods against a tapered gib, the outer surface of which faces, and is parallel to the line of travel of, the balls. The inside surface of the gib is inclined relative to its outer surface at a relatively small angle, and rests against a similarly inclined surface formed in the tongue. Means are provided for controllably adjusting the gib longitudinally, thereby to effect relatively small changes in the lateral position of its outwardly facing surface to adjust the ball clearance.

Referring now to the drawing by numerals of reference, the ball slide shown includes a tongue 10, and a slide member 12, which is supported on the tongue 10 for smooth reciprocating translation. The slide member 12 straddles the tongue 10; and the outwardly facing longitudinal sides 20 and 22 of the tongue are disposed between the inwardly facing longitudinal sides 24 and 26 of the furcations 28 and 30 of the slide member. The opposite sides 20 and 22 of the tongue 10 are grooved longitudinally as denoted at 29 and 31, respectively; and the confronting sides 24 and 26 of the slide have grooves 32 and 34, respectively, confronting grooves 29 and 31. The slide member 12 is supported on the tongue 10 by two series of balls 16 and 18.

The relief holes shown drilled laterally into the tongue 10 are to provide relief for milling the grooves 29 and 31. The balls 16 and 18 are longitudinally spaced apart by spacers or retainers 17 and 19, which may be conveniently made of low friction sheet material such as tetrafluoroethylene resin, having spaced apertures for receiving the respective balls. The balls 16 ride smoothly on two pairs of bearing rods 36, and 38, which are disposed lengthwise in the corners of grooves 29 in the tongue 10 and 32 in the portion 28 of the slide member, respectively; and the balls 18 ride on rods 40 and 42 disposed in the corners of the grooves 31 and 34, respectively. The rods 36 are retained in groove 32 by retaining plates 33 and screws 35; and similarly rods 42 are retained in groove 34 by plates 43 and screws 45. The rods 38 and 40 are retained longitudinally in the tongue grooves 29 and 31 by shoulders 47, which form the end walls of these grooves.

Figure 2:
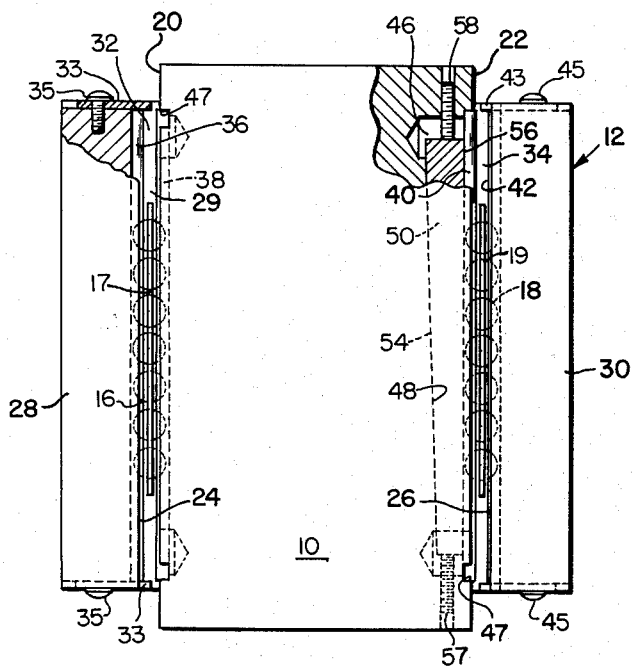
FIG. 2 is a bottom view, partly in section, of the ball slide shown in FIG. 1.
Figure 3:
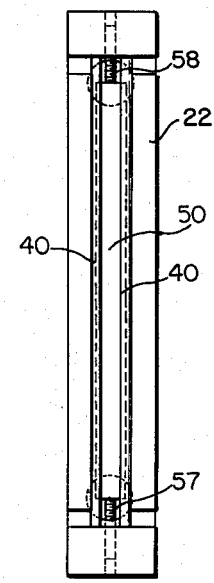
FIG. 3 is a side elevational view of the tongue, or inner member of the ball slide.

The channels or grooves 32 and 29 on the left side of the ball slide as viewed in FIGS. 1 and 2, are conventional, and so is the mounting of the rods 38 and 36 therein. As shown, however, the right hand race is provided with the pre-load adjusting means. A relatively deep slot 46 having an inclined bottom surface 48 is formed in the bottom, or outwardly facing surface of the groove 31 in the tongue to receive a tapered gib 50, which is longitudinally adjustable in the slot, and which provides lateral support for the two rods 40. The gib 50 extends longitudinally along slightly less than the full length of the rods 36 to allow for adjustment of the gib. The slope of the surface 48 at the bottom of the slot matches the inclination of the inside surface 54 of the gib 50 so that the outwardly facing surface 56 of the gib 50 is parallel to the direction of the ball travel.

The gib 50 is adjustable by a pair of screws 57 and 58, which are threaded in the ends of the tongue 10 and extend into the slot 31 to bear against the opposite ends of the gib 50, holding it firmly but adjustably in place. Since the pre-load adjustment requires only relatively small relative lateral movement of the rods 40 to bring about only a relatively small change in the effective width of the tongue 10, the wedge angle of the gib 50 is made relatively small such as about 1° to 2°, so that fine adjustments may be easily accomplished.

In this construction, the outer surface 56 of the gib 50 remains always parallel with the direction of travel of the ball slide, thus eliminating alignment problems during adjustment. In addition, the pre-load adjustment can be made after final assembly, without the need to disassemble the ball slide in any respect.

With the adjusting means of the present invention the pre-load on both ball races can be adjusted simultaneously and by adjustment of a single member, the gib 50. Moreover, this adjustment can be made very precisely.

While the invention has been described in connection with a specific embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention, what I claim is:

1. A ball slide comprising a male member, and a furcated female member which straddles said male member, one of said members being slidable relative to the other longitudinally of said members, said male member having longitudinally-extending grooves in its opposite side faces, said female member having grooves in the side of each of its furcations, the grooves in the female member being opposed to the grooves in the male member, opposed grooves defining a pair of cooperating raceways, a pair of bearing rods disposed in each raceway, the two bearing rods of each raceway being disposed in upper and lower corners, respectively, of the raceway, balls disposed between the four bearing rods of the two grooves of each pair of raceways, one of said members having a longitudinally extending slot therein which opens into one of said grooves at the bottom of said one groove, said slot having parallel plane sides and a plane bottom face which is perpendicular to its sides and which is inclined to the longitudinal direction of relative sliding movement of said members, a wedge shaped gib mounted in said slot, said gib being rectangular in cross section and having at one side a correspondingly inclined plane bottom face abutting the first-named plane bottom face and having at its opposite side a plane face extending in the direction of relative sliding movement of said members, the last-named plane face abutting the rods in the associated raceway, said gib contacting on its bottom face and lateral sides with the bottom face and sides of said slot, and means for adjusting said gib longitudinally of the direction of relative sliding of said members to adjust the pre-load on said balls.

2. A ball slide comprising a male member having outwardly facing, longitudinally extending grooves in its opposite sides, a furcated female member straddling said male member and its grooves and slidable longitudinally relative to said male member, the furcations of said female member having inwardly facing longitudinally-extending grooves confronting the outwardly facing grooves of said male member, each of said grooves having parallel plane upper and lower walls and a plane bottom wall, one of said members having a longitudinally extending slot therein opening into one of said grooves, the bottom wall of said slot being inclined to the direction of relative longitudinal sliding of said members, the bottom walls of said grooves extending in the direction of said relative longitudinal sliding, a pair of bearing rods disposed in each groove and extending in the direction of said relative longitudinal sliding, balls disposed between the bearing rods of confronting grooves for supportingly connecting said male and female members for smooth reciprocating translation relative to one another, and means for controllably adjusting the pre-load on said balls comprising a tapered, wedge-shaped gib mounted in said slot and having its bottom face seated against the bottom face of said slot and inclined relative to the direction of translation at the wedge angle of said gib, and means for controllably adjusting said gib longitudinally in said slot, the rods in said one groove being seated on the upper and lower walls of said one groove and against the outer face of said gib and being adjustable along the upper and lower walls of said one groove upon longitudinal adjustment of said gib, and the rods in the other grooves seating on the upper and lower walls and against the bottom walls of said other grooves.

3. A ball slide comprising a first member having outwardly facing, longitudinally extending, parallel grooves at opposite sides, a second member having a pair of inwardly facing grooves confronting said outwardly facing grooves of said first member, a pair of bearing rods disposed in each groove, the two rods of each pair seating against opposite sides of their respective grooves, balls disposed between the bearing rods of confronting grooves for supportingly connecting said members for smooth reciprocating translation relative to each other, and means for controllably adjusting the depthwise positions of the rods along the sides of a selected one of said grooves thereby to adjust the preload on said balls, said adjusting means including a tapered gib disposed in a slot in one of said members which opens into the bottom surface of said selected groove and which extends generally in the direction of translation, said gib being rectangular in cross-section and contacting on three of its sides with the walls of said slot and on its fourth side with the bearing rods in said selected groove, the bottom surface of said slot being inclined at the wedge angle of said gib relative to the direction of translation so that the surface of said gib which contacts the rods is parallel to the direction of translation, and means for controllably adjusting said gib longitudinally in said slot, the rods in said selected groove seating against said gib and against the sides of said selected groove.

References Cited in the file of this patent

UNITED STATES PATENTS

| | | |
|---|---|---|
| 373,866 | Torrance | Nov. 29, 1887 |
| 627,456 | Green | June 20, 1899 |
| 2,047,868 | Harley | July 14, 1936 |
| 2,309,298 | Bickel | Jan. 26, 1943 |
| 2,672,378 | McVey | Mar. 16, 1954 |
| 2,722,917 | Geller | Nov. 8, 1955 |

FOREIGN PATENTS

| | | |
|---|---|---|
| 111,321 | Australia | Sept. 5, 1940 |